United States Patent
Guo et al.

(10) Patent No.: US 12,407,381 B2
(45) Date of Patent: Sep. 2, 2025

(54) COMMUNICATION METHOD AND APPARATUS

(71) Applicant: HUAWEI TECHNOLOGIES CO., LTD., Guangdong (CN)

(72) Inventors: Senbao Guo, Xi'an (CN); Ye Yang, Shanghai (CN); Xin Meng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 18/412,571

(22) Filed: Jan. 14, 2024

(65) Prior Publication Data
US 2024/0162947 A1 May 16, 2024

Related U.S. Application Data

(63) Continuation of application No. PCT/CN2022/112434, filed on Aug. 15, 2022.

(30) Foreign Application Priority Data

Aug. 25, 2021 (CN) .......................... 202110981911.7

(51) Int. Cl.
H04B 7/04 (2017.01)
H04B 7/0456 (2017.01)

(52) U.S. Cl.
CPC ................................. *H04B 7/0456* (2013.01)

(58) Field of Classification Search
CPC ...................................... H04B 7/0456
USPC ......................................................... 375/267
See application file for complete search history.

(56) References Cited

U.S. PATENT DOCUMENTS

| | | | |
|---|---|---|---|
| 2018/0102824 A1* | 4/2018 | Jitsukawa | H04L 25/0204 |
| 2023/0040058 A1* | 2/2023 | Huang | H04B 7/066 |
| 2023/0163907 A1* | 5/2023 | Bar-Or Tillinger | H04L 25/0248 370/329 |

* cited by examiner

*Primary Examiner* — Kevin M Burd

(57) ABSTRACT

Embodiments of this application disclose a communication method and apparatus. Therefore, a beam gain of downlink channel transmission is improved, and a phase mismatch performance loss is small. The method in embodiments of this application includes: A network device may determine a first downlink statistical autocorrelation matrix of a downlink channel based on a first uplink statistical autocorrelation matrix of an uplink channel, indicate, based on a first weight indicated by a terminal, the terminal to receive a second weight of data, then determine a third weight different from the second weight based on the first downlink statistical autocorrelation matrix and the second weight, and send the data to the terminal based on the third weight.

16 Claims, 4 Drawing Sheets

COMMUNICATION METHOD AND APPARATUS

CROSS-REFERENCE TO RELATED APPLICATIONS

This application is a continuation of International Application No. PCT/CN2022/112434, filed on Aug. 15, 2022, which claims priority to Chinese Patent Application No. 202110981911.7, filed on Aug. 25, 2021. The disclosures of the aforementioned applications are hereby incorporated by reference in their entireties.

TECHNICAL FIELD

Embodiments of this application relate to the field of wireless communication technologies, and in particular, to a communication method and apparatus.

BACKGROUND

A beamforming technology is one of main technologies of a multiple-input multiple-output (multiple-input multiple-output, MIMO) system, and is a signal preprocessing means based on an antenna array. A principle of the beamforming technology is to generate a beam with directivity by adjusting a weighting coefficient of an array element in the antenna array, to obtain an array gain. Therefore, independent control on the array element is the key to obtaining the gain.

In a wireless communication system, for example, a long term evolution (long term evolution, LTE) system, a terminal performs channel estimation by using a cell-specific reference signal (cell-specific reference signal, CRS), feeds back a precoding matrix indicator (precoding matrix indicator, PMI) to a base station to indicate to precode data and send precoded data, and then receives the data from the base station based on a precoding weight corresponding to the PMI.

However, a terminal that demodulates data by using the CRS cannot obtain a high-performance beam gain due to a limitation of precision of PMI codebook quantization and a requirement of wide coverage of the CRS.

SUMMARY

Embodiments of this application provide a communication method and apparatus, to resolve a problem that a terminal cannot obtain a high-performance beam gain due to a restriction of a wide beam and impact of precision of precoding indicator codebook quantization, and improve a beam gain of downlink channel transmission when a phase mismatch performance loss is small.

According to a first aspect, an embodiment of this application provides a communication method. The method may be performed by a network device, may be performed by a component (such as a processor, a chip, or a chip system) of the network device, or may be implemented by a logical module or software that can implement all or some functions of the network device. The method includes: obtaining a first uplink statistical autocorrelation matrix of an uplink channel with a terminal, determining, based on the first uplink statistical autocorrelation matrix, a first downlink statistical autocorrelation matrix of a downlink channel with the terminal, obtaining a first precoding matrix indicator (precoding matrix indicator, PMI) from the terminal, where the first PMI indicates a first weight, determining a second weight based on the first weight, determining a third weight based on the first downlink statistical autocorrelation matrix and the second weight, where the third weight is different from the second weight, sending a second PMI to the terminal, where the second PMI indicates the second weight, and sending data to the terminal based on the third weight.

In the first aspect, an execution body of the foregoing method is, for example, the network device. The network device exchanges the data with the terminal, and the network device cannot obtain related information of the downlink channel through channel estimation. The network device may determine the first downlink statistical autocorrelation matrix of the downlink channel based on the first uplink statistical autocorrelation matrix of the uplink channel, and determine, based on the first weight indicated by the terminal and with reference to a preset weight, the second weight indicating the terminal to receive the data from the network device. The network device further determines, based on the first downlink statistical autocorrelation matrix and the second weight, the third weight different from the second weight, and sends the data based on the third weight. The terminal may receive the data based on the second weight. Although there is a phase difference between the third weight and the second weight, a phase mismatch performance loss is small, and a beam gain can be improved. Therefore, according to the foregoing method provided in this application, a downlink beam gain can be improved when precision of precoding indicator codebook quantization is restricted.

In a possible implementation, the determining, based on the first uplink statistical autocorrelation matrix, a first downlink statistical autocorrelation matrix of a downlink channel with the terminal includes: determining the first downlink statistical autocorrelation matrix based on the first uplink statistical autocorrelation matrix and one or more of a first uplink/downlink frequency, a first antenna form, or a first dipole spacing.

In the foregoing possible implementation, reciprocity between information about the uplink channel and the downlink channel may be used to determine the first downlink statistical autocorrelation matrix based on one or more of the first uplink/downlink frequency between the network device and the terminal, the first antenna form, or the first dipole spacing and with reference to the first uplink statistical autocorrelation matrix, to obtain a weight with more accurate directivity. Therefore, power of a target signal is effectively improved.

In a possible implementation, the determining the first downlink statistical autocorrelation matrix based on the first uplink statistical autocorrelation matrix and one or more of a first uplink/downlink frequency, a first antenna form, or a first dipole spacing includes: processing the first uplink statistical autocorrelation matrix based on a first transformation matrix, to obtain the first downlink statistical autocorrelation matrix, where the first transformation matrix is related to one or more of the first uplink/downlink frequency, the first antenna form, or the first dipole spacing.

In the foregoing possible implementation, the information about the downlink channel and the uplink channel is determined based on one or more of the first uplink/downlink frequency, the first antenna form, or the first dipole spacing, and then the first transformation matrix is generated based on the information about the downlink channel and the uplink channel. The first transformation matrix may also be understood as an uplink statistical covariance correction matrix and/or a downlink statistical covariance correction matrix, and includes a parameter determined by one or more of the first uplink/downlink frequency, the first antenna form, or the first dipole spacing. By using the first transform matrix, the first uplink statistical autocorrelation matrix may be modified to the first downlink statistical autocorrelation matrix, to obtain the weight with more accurate directivity. Therefore, power of the target signal is effectively improved.

In a possible implementation, the third weight satisfies:

$$w_d = (R_{DL} + \delta^2 I)^{-1} R_{DL} w_p$$

$w_d$ represents the third weight, $w_p$ represents the second weight, $R_{DL}$ represents the first downlink statistical autocorrelation matrix, $\delta^2$ represents a first channel estimation error and a first quantization error, I represents an identity matrix, and $(\cdot)^{-1}$ represents inversion.

In the foregoing possible implementation, the third weight actually used for data sending is different from the second weight for notifying the terminal. Although there is the phase difference between the third weight and the second weight, the phase mismatch performance loss can be reduced in the foregoing manner, and the beam gain can be improved. Therefore, according to the foregoing method provided in this application, the beam gain can be improved when the precision of the precoding indicator codebook quantization is restricted.

According to a second aspect, an embodiment of this application provides a communication method. The method may be performed by a terminal, may be performed by a component (such as a processor, a chip, or a chip system) of the terminal, or may be implemented by a logical module or software that can implement all or some functions of the terminal. The method includes: obtaining a second downlink statistical autocorrelation matrix of a downlink channel with a network device, determining, based on the second downlink statistical autocorrelation matrix, a second uplink statistical autocorrelation matrix of an uplink channel with the network device, obtaining a third PMI from the network device, where the third PMI indicates a fourth weight, determining a fifth weight based on the second uplink statistical autocorrelation matrix and the fourth weight, where the fifth weight is different from the fourth weight, and sending data to the network device based on the fifth weight.

In the second aspect, an execution body of the foregoing method is, for example, the terminal. The terminal exchanges the data with the network device, and the terminal cannot obtain related information about the uplink channel through channel estimation. The terminal may determine, based on the second downlink statistical autocorrelation matrix of the downlink channel, the second uplink statistical autocorrelation matrix of the uplink channel, and determine, based on the fourth weight indicated by the network device and with reference to the second uplink statistical autocorrelation matrix, the fifth weight different from the fourth weight. The terminal sends the data to the network device based on the fifth weight, and the network device receives the data based on the fourth weight. Although there is a phase difference between the fifth weight and the fourth weight, a phase mismatch performance loss is small, and a beam gain can be improved. Therefore, according to the foregoing method provided in this application, an uplink beam gain can be improved when precision of precoding indicator codebook quantization is restricted.

In a possible implementation, the foregoing step of the determining, based on the second downlink statistical autocorrelation matrix, a second uplink statistical autocorrelation matrix of an uplink channel with the network device includes: determining the second uplink statistical autocorrelation matrix based on the second downlink statistical autocorrelation matrix and one or more of a second uplink/downlink frequency, a second antenna form, or a second dipole spacing.

In a possible implementation, the foregoing step of the determining the second uplink statistical autocorrelation matrix based on the second downlink statistical autocorrelation matrix and one or more of a second uplink/downlink frequency, a second antenna form, or a second dipole spacing includes: processing the second downlink statistical autocorrelation matrix based on a second transformation matrix, to obtain the second uplink statistical autocorrelation matrix, where the second transformation matrix is related to one or more of the second uplink/downlink frequency, the second antenna form, or the second dipole spacing.

In a possible implementation, the fifth weight satisfies:

$$w_{d'} = (R_{UL}' + (\delta')^2 I)^{-1} R_{UL}' w_{p'}'$$

$w_{d'}$ represents the fifth weight, $w_{p'}$ represents the fourth weight, $R_{UL}'$ represents the second uplink statistical autocorrelation matrix, $(\delta')^2$ represents a second channel estimation error and a second quantization error, I represents an identity matrix, and $(\cdot)^{-1}$ represents inversion.

According to a third aspect, an embodiment of this application provides a communication apparatus, and the communication apparatus can implement the method according to any one of the first aspect or the possible implementations of the first aspect. The apparatus includes a corresponding unit or module configured to perform the foregoing method. The unit or module included in the apparatus may be implemented in a software and/or hardware manner. For example, the apparatus may be a network device, may be a chip, a chip system, or a processor that supports the network device in implementing the foregoing method, or may be a logical module or software that can implement all or some functions of the network device.

According to a fourth aspect, an embodiment of this application provides a communication apparatus, and the communication apparatus can implement the method according to any one of the second aspect or the possible implementations of the second aspect. The apparatus includes a corresponding unit or module configured to perform the foregoing method. The unit or module included in the apparatus may be implemented in a software and/or hardware manner. For example, the apparatus may be a terminal, may be a chip, a chip system, or a processor that supports the terminal in implementing the foregoing method, or may be a logical module or software that can implement all or some functions of the terminal.

According to a fifth aspect, an embodiment of this application provides a communication apparatus, including a processor, where the processor is coupled to a memory, the memory is configured to store instructions, and when the instructions are executed by the processor, the apparatus is enabled to implement the method according to any one of the first aspect or the possible implementations of the first aspect. For example, the apparatus may be a network device, or may be a chip or a chip system that supports the network device in implementing the foregoing method.

According to a sixth aspect, an embodiment of this application provides a communication apparatus, including a processor, where the processor is coupled to a memory, the memory is configured to store instructions, and when the instructions are executed by the processor, the apparatus is enabled to implement the method according to any one of the second aspect or the possible implementations of the second aspect. For example, the apparatus may be a terminal, or may be a chip or a chip system that supports the terminal in implementing the foregoing method.

According to a seventh aspect, an embodiment of this application provides a computer-readable storage medium, where the computer-readable storage medium stores instructions, and when the instructions are executed, a computer is enabled to perform the method according to any one of the first aspect or the possible implementations of the first aspect.

According to an eighth aspect, an embodiment of this application provides a computer-readable storage medium, where the computer-readable storage medium stores instructions, and when the instructions are executed, a computer is enabled to perform the method according to any one of the second aspect or the possible implementations of the second aspect.

According to a ninth aspect, an embodiment of this application provides a computer program product, where the computer program product includes computer program code, and when the computer program code is executed, a computer is enabled to perform the method according to any one of the first aspect or the possible implementations of the first aspect.

According to a tenth aspect, an embodiment of this application provides a computer program product, where the computer program product includes computer program code, and when the computer program code is executed, a computer is enabled to perform the method according to any one of the second aspect or the possible implementations of the second aspect.

For technical effects of the second aspect to the tenth aspect, refer to the descriptions in the first aspect. Details are not repeated.

DESCRIPTION OF EMBODIMENTS

Figure 1:
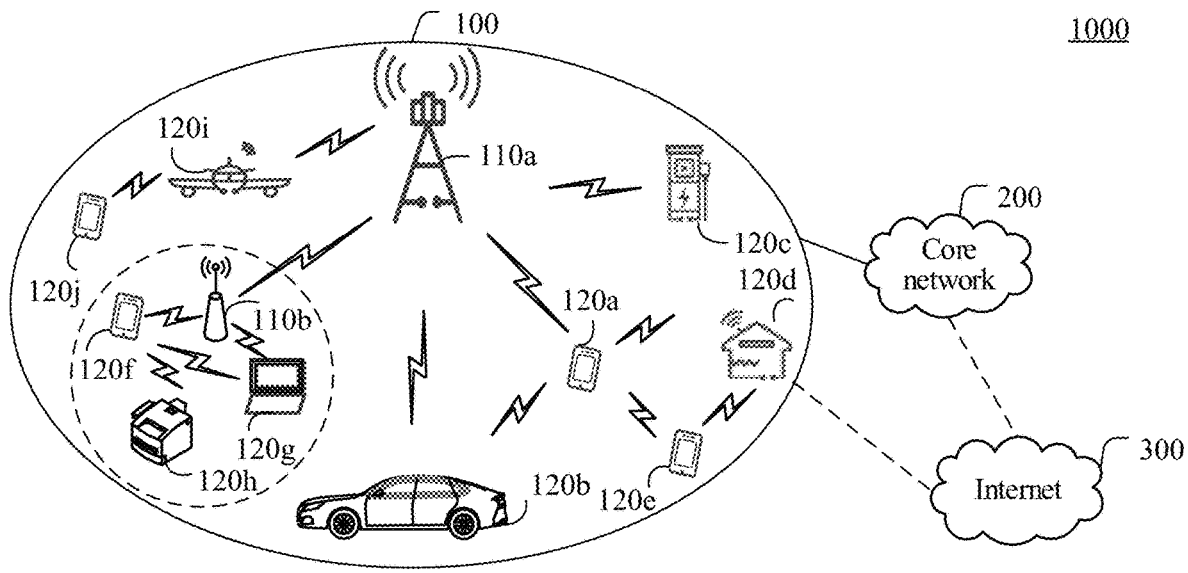
FIG. 1 is a schematic diagram of a communication system according to this application.

Embodiments of this application provide a communication method and apparatus. Therefore, a beam gain of downlink channel transmission is improved, and a phase mismatch performance loss is small.

The following describes embodiments of this application with reference to the accompanying drawings.

In this application, the terms "first", "second", and the like are intended to distinguish between similar objects but do not necessarily indicate a specific order or sequence. It should be understood that data used in such a way is interchangeable in proper circumstances so that embodiments described herein can be implemented in orders other than the order illustrated or described herein. In addition, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

"Example" in this application means "used as an example or illustration". Any content described herein as an "example" is not necessarily explained as being superior or better than other content.

In this application, "at least one" means one or more, and "a plurality of" means two or more. "And/or" describes an association relationship between associated objects, and indicates that three relationships may exist, for example, A and/or B may indicate the following cases: A exists alone, both A and B exist, and B exists alone, where A and B may be singular or plural. The character "/" generally indicates that the associated objects are in an "or" relationship. "At least one of the following" or a similar expression thereof means any combination of these items, including any combination of singular items (pieces) or plural items (pieces). For example, "one or more of A, B, or C" includes A, B, C, AB, AC, BC, or ABC. In addition, unless otherwise specified, ordinal numbers such as "first" and "second" mentioned in embodiments of this application are used to distinguish between a plurality of objects, and are not used to limit a sequence, a time sequence, a priority, or importance of the plurality of objects.

In addition, to better describe this application, specific details are provided in the following specific implementations. A person skilled in the art should understand that this application can also be implemented without some specific details. In some instances, a method, a means, an element, and a circuit that are well-known to a person skilled in the art are not described in detail, so that a subject matter of this application is highlighted.

The following explains some terms in this application.

Sending weight: Data is transmitted between a network device and a terminal by using a multiple-input multiple-output (multiple-input multiple-output, MIMO) technology. Because there is a correlation among a plurality of antennas, the network device or the terminal may weight data to be sent. To be specific, different sending complex values are assigned to different antennas, to control a width, a direction, and the like of a beam, so that the beam points to an expected direction, to implement beam tracking and suppress a side lobe level that interferes with a direction. A weight used by the network device to weight data to be sent to the terminal is a downlink sending weight, and a weight used by the terminal to weight data to be sent to the network device is an uplink sending weight. It may be understood that weighting may also be sometimes referred to as precoding.

In this application, $(\bullet)^H$ represents performing a conjugate transpose operation on a matrix, $E\{\bullet\}$ represents an averaging operation, $(\bullet)^*$ is a conjugate operation, $|\bullet|^2$ is a modulo square operation, $(\bullet)^{-1}$ represents inversion, $(\bullet)^\dagger$ represents pseudo-inversion, and $<a, b>$ represents an inner product of a vector a and a vector b.

vec($\bullet$) represents a matrix straightening operation. To be specific, the matrix is arranged column by column (or row by row) in a column (or row) order, to form a vector. The matrix straightening operation is also referred to as matrix vectorization (for example, column vectorization or row vectorization).

For a matrix including a complex number (referred to as a complex matrix for short), a real part of an element in the complex matrix may be extracted to form a real part column vector in a column order, an imaginary part of the element in the complex matrix may be extracted to form an imaginary part column vector in a column order, and the real part column vector is followed by the imaginary part column vector, to complete a matrix straightening operation of the complex matrix. For example, if the complex matrix is [2+1j, 3−5j], a straightened vector is $(2, 3, 1, -5)^H$. For the complex matrix, $\mathcal{R}(\bullet)$ represents the real part of the element in the complex matrix, and $\mathcal{I}(\bullet)$ represents the imaginary part of the element in the complex matrix. $\text{vec}([\mathcal{R}(\bullet) \ \mathcal{I}(\bullet)])$ may represent the matrix straightening operation of the complex matrix.

The matrix straightening operation may alternatively be performed in another manner. For example, the matrix straightening operation may be performed by using a Hermitian (Hermitian) characteristic and a Toeplitz (Toeplitz) characteristic. A manner of matrix straightening is not limited in this application.

For matrix restoration performed on a vector obtained by performing the matrix straightening operation on the complex matrix, a column vector is used as an example. The column vector may be divided into a real part column vector and an imaginary part column vector that have an equal quantity of elements, and then the real part column vector and the imaginary part column vector are restored to a position of each element in the matrix based on a quantity of columns in the matrix before the matrix straightening operation. That is, the matrix restoration is completed. For example, for the foregoing obtained vector $(2, 3, 1, -5)^H$, a real part column vector is $(2, 3)^H$, an imaginary part column vector is $(1, -5)^H$, and a quantity of columns in the matrix before the matrix straightening operation is 2. Therefore, the complex matrix may be restored to [2+1j, 3−5j].

The matrix restoration may alternatively be performed in another manner. For example, for a column vector obtained by performing a matrix straightening operation by using the Hermitian (Hermitian) characteristic and the Toeplitz (Toeplitz) characteristic, matrix restoration may be performed based on the corresponding Hermitian characteristic and Toeplitz characteristic. A manner of the matrix restoration is not limited in this application.

FIG. 1 is a schematic diagram of an architecture of a communication system 1000 to which an embodiment of this application is applied. As shown in FIG. 1, the communication system includes a radio access network 100 and a core network 200. Optionally, the communication system 1000 may further include the Internet 300. The radio access network 100 may include at least one radio access network device (for example, 110a and 110b in FIG. 1), and may further include at least one terminal (for example, 120a to 120j in FIG. 1). The terminal is connected to the radio access network device in a wireless manner, and the radio access network device is connected to the core network in a wireless or wired manner. A core network device and the radio access network device may be independent different physical devices, or a function of the core network device and a logical function of the radio access network device may be integrated into a same physical device, or a part of functions of the core network device and a part of functions of the radio access network device may be integrated into a physical device. The terminals may be connected to each other and the radio access network devices may be connected to each other in a wired or wireless manner. FIG. 1 is only a schematic diagram. The communication system may further include another network device, for example, may further include a wireless relay device and a wireless backhaul device. The wireless relay device and the wireless backhaul device are not shown in FIG. 1.

The radio access network device (sometimes also referred to as a network device in this application) may be a base station (base station), an evolved NodeB (evolved NodeB, eNodeB), a transmission reception point (transmission reception point, TRP), a next generation NodeB (next generation NodeB, gNB) in a $5^{th}$ generation (5th generation, 5G) mobile communication system, a next generation NodeB in a $6^{th}$ generation (6th generation, 6G) mobile communication system, a base station in a future mobile communication system, an access node in a Wi-Fi system, or the like; or may be a module or a unit that implements some functions of the base station, for example, may be a central unit (central unit, CU), or may be a distributed unit (distributed unit, DU). The radio access network device may be a macro base station (for example, 110a in FIG. 1), may be a micro base station or an indoor station (for example, 110b in FIG. 1), or may be a relay node, a donor node, or the like. It may be understood that all or some functions of the radio access network device in this application may also be implemented by using a software function running on hardware, or may be implemented by using an instantiated virtualization function on a platform (for example, a cloud platform). A specific technology and a specific device form used by the radio access network device are not limited in embodiments of this application. For ease of description, the following uses an example in which the base station is used as the radio access network device for description.

The terminal may also be referred to as a terminal device, user equipment (user equipment, UE), a mobile station, a mobile terminal, or the like. The terminal may be widely used in various scenarios, for example, device-to-device (device-to-device, D2D), vehicle-to-everything (vehicle-to-everything, V2X) communication, machine-type communication (machine-type communication, MTC), internet of things (internet of things, IoT), virtual reality, augmented reality, industrial control, autonomous driving, telemedicine, a smart grid, smart furniture, a smart office, a smart wearable, smart transportation, a smart city, and the like. The terminal may be a mobile phone, a tablet computer, a computer with a wireless transceiver function, a wearable device, a vehicle, a drone, a helicopter, an airplane, a ship, a robot, a robotic arm, a smart home device, or the like. A specific technology and a specific device form used by the terminal are not limited in embodiments of this application.

The base station and the terminal may be fixed or movable. The base station and the terminal may be deployed on land, including indoor or outdoor, handheld or in-vehicle; may be deployed on water; or may be deployed on aircraft, a balloon, or a satellite in the air. Application scenarios of the base station and the terminal are not limited in embodiments of this application.

Roles of the base station and the terminal may be relative. For example, a helicopter or a drone 120i in FIG. 1 may be configured as a mobile base station, and for terminals 120j accessing the radio access network 100 by using 120i, the terminal 120i is the base station. However, for a base station 110a, 120i is the terminal. That is, communication between 110a and 120i is performed by using a wireless air interface protocol. It is clear that the communication between 110a and 120i may alternatively be performed by using an interface protocol between base stations. In this case, for 110a, 120i is also the base station. Therefore, both the base station and the terminal may be collectively referred to as communication apparatuses, 110a and 110b in FIG. 1 may be referred to as communication apparatuses having a base station function, and 120a to 120j in FIG. 1 may be referred to as communication apparatuses having a terminal function.

Communication between the base station and the terminal, between the base stations, and between terminals may be performed by using a licensed spectrum, may be performed by using an unlicensed spectrum, or may be performed by using both the licensed spectrum and the unlicensed spectrum. Communication may be performed by using a spectrum below 6 gigahertz (gigahertz, GHz), may be performed by using a spectrum above 6 GHz, or may be simultaneously performed by using the spectrum below 6 GHz and the spectrum above 6 GHz. A spectrum resource used for wireless communication is not limited in embodiments of this application.

In embodiments of this application, a function of the base station may alternatively be performed by a module (for example, a chip) in the base station, or may be performed by a control subsystem that includes the base station function. The control subsystem that includes the function of the base station herein may be a control center in the foregoing application scenarios of the terminal such as a smart grid, industrial control, intelligent transportation, and a smart city. A function of the terminal may alternatively be performed by a module (for example, a chip or a modem) in the terminal, or may be performed by an apparatus that includes the terminal function.

In this application, the base station sends a downlink signal (for example, a synchronization signal or a downlink reference signal) or downlink information to the terminal, where the downlink information is carried on a downlink channel; and the terminal sends an uplink signal (for example, an uplink reference signal) or uplink information to the base station, where the uplink information is carried on an uplink channel.

The terminal may perform channel estimation by using a cell-specific reference signal (cell-specific reference signal, CRS), feed back a precoding matrix indicator (precoding matrix indicator, PMI) to the base station to indicate to precode data and send precoded data, and then receive the data from the base station based on a precoding weight corresponding to the PMI.

However, for the terminal that demodulates the data by using the CRS, a high-performance beam gain cannot be obtained due to a limitation of precision of PMI codebook quantization and a requirement of wide coverage of the CRS.

For example, when the base station sends the data to a terminal in a $4^{th}$ transmission mode (4th transmission mode, TM4), namely, a closed-loop spatial multiplexing mode, in a long term evolution (long term evolution, LTE) system, a PMI fed back by the terminal in the TM4 based on the CRS is used as a reference for determining a downlink sending weight. Because the CRS is sent by using a wide beam, the terminal in the TM4 is restricted by the wide beam and affected by the precision of the PMI codebook quantization, and cannot obtain an optimal beam gain.

The terminal in the TM4 precodes and sends precoded data based on the PMI fed back by the terminal. The base station notifies, through a PDCCH, the terminal to use a PMI index. The terminal performs channel estimation by using the CRS to determine a channel value, determines the corresponding precoding weight by using the PMI, and performs equalization to obtain a data value. As shown in Formula (1), y is a received signal, H is a channel estimated by using the CRS, P is the precoding weight, s is sent data, and n is added interference and noise after the signal passes through the channel.

$$y=HPs+n \qquad (1)$$

To resolve the foregoing problem, an embodiment of this application provides a downlink transmission method. The method is described as follows.

Figure 2:
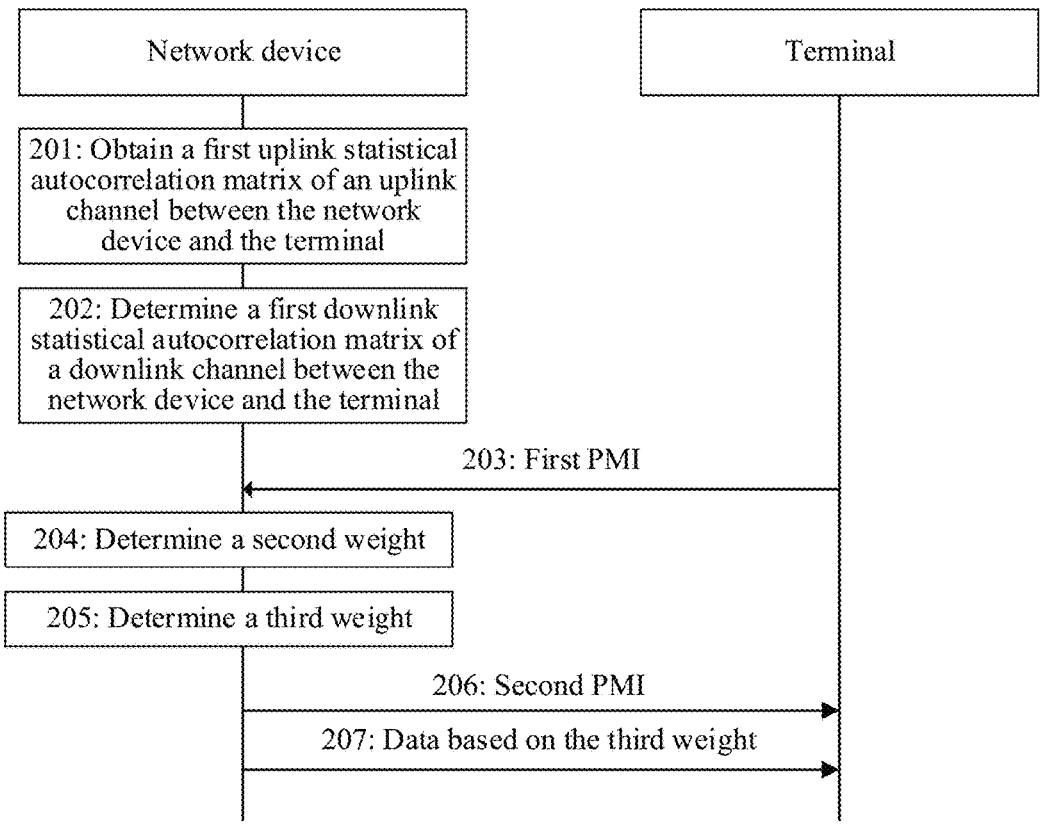
FIG. 2 is a schematic diagram of a communication method according to this application.

FIG. 2 is a schematic diagram of a communication method according to an embodiment of this application. The method may be applied to the communication system shown in FIG. 1, but this embodiment of this application is not limited thereto. In FIG. 2, an example in which a network device and a terminal are used as execution bodies of interaction illustration is used to illustrate the method. However, this application does not limit an execution body of the interaction illustration. For example, the network device in FIG. 2 may alternatively be a chip, a chip system, or a processor that supports the network device in implementing the method, or may be a logical module or software that can implement all or some functions of the network device. The terminal in FIG. 2 may alternatively be a chip, a chip system, or a processor that supports the terminal in implementing the method, or may be a logical module or software that can implement all or some functions of the terminal.

201: The network device obtains a first uplink statistical autocorrelation matrix of an uplink channel between the network device and the terminal.

In this embodiment of this application, the network device sends downlink data and a downlink reference signal. The terminal receives the downlink data sent by the network device, and may feed back, to the network device, whether the downlink data is successfully received. The terminal may further perform downlink channel quality measurement by using the downlink reference signal sent by the network device, and feed back related measurement information to the network device. The terminal may send uplink data and an uplink reference signal to the network device. The network device receives the uplink data sent by the terminal, and may indicate, to the terminal, whether the uplink data is successfully received. The network device may further perform channel estimation and channel measurement by using the uplink reference signal sent by the terminal.

The network device may send configuration information to the terminal on a downlink channel. The configuration information may be used to configure the terminal to send a sounding reference signal (sounding reference signal, SRS) to the network device, so that the terminal may send the SRS to the network device based on the configuration information. The network device receives the SRS, performs uplink channel estimation, and obtains, by using a channel estimation result, the first uplink statistical autocorrelation matrix corresponding to the uplink channel. The first uplink statistical autocorrelation matrix reflects a statistical characteristic of the uplink channel, for example, reflects channel state information (channel state information, CSI) of the uplink channel.

In a possible implementation, a first uplink statistical autocorrelation matrix $R_{UL}$ satisfies the following formula:

$$R_{UL} = \sum_{t=0}^{T-1} \sum_{i=0}^{N-1} H_{t,i} H_{t,i}^H \qquad (2)$$

$H_{t,i}$ represents channel information obtained by performing uplink channel estimation on an $i^{th}$ subcarrier in frequency domain at a $t^{th}$ time in time domain, T represents a quantity of collected time domain sampling points, and N represents a quantity of subcarriers collected in frequency domain.

Alternatively, time-frequency domain filtering may be performed, and a current filtered value $R_{t,UL}$ of the first uplink statistical autocorrelation matrix $R_{UL}$ satisfies the following formula:

$$R_{t,UL}=(1-a)R_{t-1,UL}+a\hat{R}_{t,UL} \quad (3)$$

a is a filtering coefficient, $R_{t,UL}$ represents a value that is obtained through filtering of the first uplink statistical autocorrelation matrix at a $t^{th}$ time in time domain, $R_{t-1,UL}$ represents a value that is obtained through filtering of the first uplink statistical autocorrelation matrix at a $(t-1)^{th}$ time in time domain, and $\hat{R}_{t,UL}=\Sigma_{i=0}^{N-1}H_{t,i}H_{t,i}^{H}$.

202: The network device determines, based on the first uplink statistical autocorrelation matrix, a first downlink statistical autocorrelation matrix of a downlink channel with the terminal.

In this embodiment of this application, to perform downlink data transmission, the network device needs to obtain downlink channel information, where the downlink channel information includes a PMI and a channel quality indicator (channel quality indicator, CQI). Therefore, the terminal may obtain the downlink channel information through measurement based on a downlink reference signal (for example, a CRS), and then feed back the foregoing information to the network device through the uplink channel. However, information such as the PMI and the CQI is information obtained by compressing the downlink channel information to some extent, and cannot accurately reflect an actual situation of the downlink channel. An uplink and a downlink in a communication system sometimes have a channel characteristic such as channel reciprocity. For example, in a time division duplex (time division duplex, TDD) system, an uplink and a downlink use a same frequency, and the uplink and the downlink generally have ideal channel reciprocity. When an antenna is ideally calibrated, the network device may perform, by using the channel reciprocity and based on a first uplink statistical autocorrelation matrix obtained through uplink SRS measurement, a conversion operation to obtain the first downlink statistical autocorrelation matrix, where the first downlink statistical autocorrelation matrix is used for the downlink data transmission. The first downlink statistical autocorrelation matrix reflects a statistical characteristic of the downlink channel, for example, reflects CSI of the downlink channel.

In a possible implementation of step 202, the network device determines the first downlink statistical autocorrelation matrix based on the first uplink statistical autocorrelation matrix and one or more of a first uplink/downlink frequency, a first antenna form, or a first dipole spacing. For example, the network device may determine the first downlink statistical autocorrelation matrix based on the first uplink/downlink frequency and the first uplink statistical autocorrelation matrix, may determine the first downlink statistical autocorrelation matrix based on the first antenna form and the first uplink statistical autocorrelation matrix, may determine the first downlink statistical autocorrelation matrix based on the first dipole spacing and the first uplink statistical autocorrelation matrix, may determine the first downlink statistical autocorrelation matrix based on the first uplink/downlink frequency, the first antenna form, and the first uplink statistical autocorrelation matrix, may determine the first downlink statistical autocorrelation matrix based on the first uplink/downlink frequency, the first dipole spacing, and the first uplink statistical autocorrelation matrix, may determine the first downlink statistical autocorrelation matrix based on the first dipole spacing, the first antenna form, and the first uplink statistical autocorrelation matrix, or may determine the first downlink statistical autocorrelation matrix simultaneously based on the first uplink/downlink frequency, the first antenna form, the first dipole spacing, and the first uplink statistical autocorrelation matrix.

The network device may obtain one or more of a first uplink/downlink frequency, a first antenna form, or a first dipole spacing that is preconfigured or is obtained through detection and that is used for communication between the network device and the terminal. The first antenna form may include many types, for example, a linear array, a planar array, a uniform array, or a non-uniform array. The first uplink/downlink frequency is a frequency of an uplink carrier and/or a frequency of a downlink carrier. The first dipole spacing is a distance between physical units for sending and receiving signals by the antenna.

In a possible implementation of determining the first downlink statistical autocorrelation matrix based on the first uplink statistical autocorrelation matrix and one or more of the first uplink/downlink frequency, the first antenna form, or the first dipole spacing, the network device processes the first uplink statistical autocorrelation matrix based on a first transformation matrix, to obtain the first downlink statistical autocorrelation matrix. The first transformation matrix is related to one or more of the first uplink/downlink frequency, the first antenna form, or the first dipole spacing.

The first transformation matrix may also be understood as an uplink statistical covariance correction matrix and/or a downlink statistical covariance correction matrix, and is determined by the network device based on one or more of the first uplink/downlink frequency, the first antenna form, or the first dipole spacing. The first transformation matrix may reflect a difference between the uplink channel information and the downlink channel information, or may reflect channel reciprocity between the uplink channel and the downlink channel.

Specifically, the first downlink statistical autocorrelation matrix determined by the network device satisfies the following formula:

$$r^d = Tr^u \quad (4)$$

$r^u = \text{vec}([\mathcal{R}(R_{UL})\ \mathcal{I}(R_{UL})])$, $r^d = \text{vec}([\mathcal{R}(R_{DL})\ \mathcal{I}(R_{DL})])$, $R_{DL}$ represents the first downlink statistical autocorrelation matrix, T is the first transformation matrix, and T satisfies the following formulas:

$$T = QG^{u\dagger} \quad (5)$$

$$Q = \begin{bmatrix} \langle g_1^u, g_1^d \rangle & \langle g_2^u, g_1^d \rangle & \cdots & \langle g_M^u, g_1^d \rangle \\ \langle g_1^u, g_2^d \rangle & \langle g_2^u, g_2^d \rangle & \cdots & \langle g_M^u, g_2^d \rangle \\ \vdots & \vdots & \ddots & \vdots \\ \langle g_1^u, g_M^d \rangle & \langle g_2^u, g_M^d \rangle & \cdots & \langle g_M^u, g_M^d \rangle \end{bmatrix} \quad (6)$$

$$G^u = \begin{bmatrix} \langle g_1^u, g_1^u \rangle & \langle g_2^u, g_1^u \rangle & \cdots & \langle g_M^u, g_1^u \rangle \\ \langle g_1^u, g_2^u \rangle & \langle g_2^u, g_2^u \rangle & \cdots & \langle g_M^u, g_2^u \rangle \\ \vdots & \vdots & \ddots & \vdots \\ \langle g_1^u, g_M^u \rangle & \langle g_2^u, g_M^u \rangle & \cdots & \langle g_M^u, g_M^u \rangle \end{bmatrix} \quad (7)$$

$$g_m^u = (g_m^u(\theta_1), g_m^u(\theta_2), \ldots, g_m^u(\theta_N))^H, m = 1 \ldots M \quad (8)$$

$$g_m^d = (g_m^d(\theta_1), g_m^d(\theta_2), \ldots, g_m^d(\theta_N))^H, m = 1 \ldots M \quad (9)$$

$g_m^u(\theta_i)$ is one of M elements in a column vector obtained by performing column vectorization on $a^u(\theta_i)a^u(\theta_i)^H$, $g_m^d(\theta_i)$ is one of M elements in a column vector obtained by performing column vectorization on $a^d(\theta_i)a^d(\theta_i)^H$, m=1 . . . M, M=2N², i=1 . . . N, $a^u(\theta_i)$ is a steering vector of an uplink subpath, $a^d(\theta_i)$ is a steering vector of a downlink subpath, $\theta_i$ is an arriving angle of an $i^{th}$ subpath, and N is a quantity of antenna channels or a quantity of dipoles. In a MIMO technology, N antennas are used to send and receive data. A channel between each pair of a sending antenna and a receiving antenna between two devices is referred to as a subpath. When the N antennas are used to send and receive data, there are N subpaths. A subpath used by the network device to send data to the terminal is referred to as a downlink subpath, and a subpath used by the terminal to send data to the network device is referred to as an uplink subpath. A steering vector of the subpath may reflect a direction and strength of a signal on the subpath.

In the foregoing implementation, the network device may determine the steering vector of the uplink subpath and a steering vector of the downlink subpath based on one or more of the first uplink/downlink frequency, the first antenna form, or the first dipole spacing.

$a^u(\theta_i)$ is related to one or more of the first uplink frequency, the first antenna form, and the first dipole spacing. To be specific, the network device may determine $a^u(\theta_i)$ based on the first uplink frequency, may determine $a^u(\theta_i)$ based on the first antenna form, or may determine $a^u(\theta_i)$ based on the first dipole spacing. In this embodiment of this application, $a^u(\theta_i)$ may alternatively be determined based on two or three of the first uplink frequency, the first antenna form, and the first dipole spacing. This is not limited in this embodiment of this application. $a^d(\theta_i)$ is related to one or more of the first downlink frequency, the first antenna form, and the first dipole spacing. To be specific, the network device may determine $a^d(\theta_i)$ based on the first downlink frequency, may determine $a^d(\theta_i)$ based on the first antenna form, or may determine $a^d(\theta_i)$ based on the first dipole spacing. In this embodiment of this application, $a^d(\theta_i)$ may alternatively be determined based on two or three of the first downlink frequency, the first antenna form, and the first dipole spacing. This is not limited in this embodiment of this application.

Figure 3:
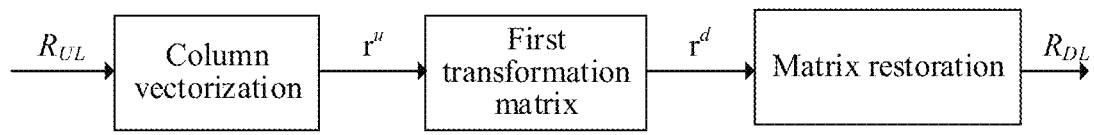
FIG. 3 is a schematic flowchart of obtaining a downlink statistical autocorrelation matrix according to this application.

For example, a specific implementation procedure in which the network device determines the first downlink statistical autocorrelation matrix by using the first transformation matrix after obtaining the first uplink statistical autocorrelation matrix is shown in FIG. 3.

First, column vectorization may be performed on $R_{UL}$, for example, column vectorization may be performed on $R_{UL}$ by using a Hermitian (Hermitian) characteristic and a Toeplitz (Toeplitz) characteristic, to generate $r^u$, and $r^d = Tr^u$ is obtained based on the first transformation matrix T. The network device may obtain the first downlink statistical autocorrelation matrix $R_{DL}$ based on $r^d$ through matrix restoration.

203: The terminal sends a first PMI to the network device, and correspondingly, the network device obtains the first PMI from the terminal. The first PMI indicates a first weight.

In this embodiment of this application, the network device may send the CRS to the terminal, and the CRS may be used for coherent detection and data demodulation of the terminal. The network device may weight the CRS based on a preset weight. Due to the preset weight, a bit error rate of receiving the CRS by the terminal can be reduced, to improve a wide beam gain.

After receiving the CRS, the terminal may determine the first weight based on the CRS, and feed back the first PMI indicating the first weight to the network device.

It may be understood that a relative sequence between step 203 and steps 201 and 202 is not limited in this application. For example, 203 may be implemented before 201, may be implemented between 201 and 202, may be implemented after 202, or may be implemented together with 201 or 202. This is not limited in this application.

204: The network device determines a second weight based on the first weight.

In this embodiment of this application, after receiving the first PMI, the network device may obtain the first weight based on the first PMI, and determine, based on the first weight, the second weight indicating the terminal to receive the data. For example, $w_p$ represents the second weight, $V_{CRS}$ is the preset weight of the CRS in step 203, and $W_{PMI}$ is the first weight, so that $w_p$ satisfies the following formula:

$$w_p = V_{CRS} * W_{PMI} \tag{10}$$

205: The network device determines a third weight based on the first downlink statistical autocorrelation matrix and the second weight.

In this embodiment of this application, the network device may determine, based on the first downlink statistical autocorrelation matrix and the second weight under different design principles, the third weight used for sending the data. For example, a minimum phase-offset principle may be used. To be specific, a phase difference between the second weight and the third weight that are indicated by the network device to the terminal is the smallest, so that a phase mismatch performance loss can be reduced.

Optionally, the third weight $w_d$ satisfies the following formula:

$$w_d = (R_{DL} + \delta^2 I)^{-1} R_{DL} w_p \tag{11}$$

$R_{DL}$ represents the first downlink statistical autocorrelation matrix, $w_p$ represents the second weight, $\delta^2$ represents a first channel estimation error and a first quantization error, and I represents an identity matrix. The first channel estimation error is generated due to a channel estimation mismatch that occurs when the network device performs uplink channel estimation, and the first quantization error is generated by codebook quantization that exists in the first PMI.

In a low signal-to-noise ratio scenario, $\delta^2$ in Formula (11) approaches infinity, that is, $\delta^2 \to +\infty$, so that Formula (11) may be changed to $w_d = R_{DL} w_p$.

The network device determines the third weight based on the first downlink statistical autocorrelation matrix, the first channel estimation error generated due to the channel estimation mismatch, the first quantization error generated due to the first PMI, and the second weight, so that when the terminal receives, by using the second weight, data weighted by using the third weight, on a basis of obtaining a signal power gain, a loss caused by a weight mismatch can be reduced as much as possible.

206: The network device sends a second PMI to the terminal, where the second PMI indicates the second weight. Correspondingly, the terminal receives the second PMI from the network device, and obtains the second weight based on the second PMI.

In this embodiment of this application, after determining the second weight, the network device sends, to the terminal, the second PMI indicating the second weight, so that after receiving the second PMI, the terminal may determine the second weight based on the second PMI, and receive the data from the network device based on the second weight.

A sequence of step 205 and step 206 is not limited in this embodiment of this application.

207: The network device sends the data to the terminal based on the third weight, and correspondingly, the terminal receives the data from the network device based on the second weight.

In this embodiment of this application, after determining the third weight, the network device may weight service data to be sent to the terminal by using the determined third weight, and then send weighted service data to the terminal. A signal received by the terminal satisfies the following formula:

$$y = Hw_d s + n \qquad (12)$$

y represents the signal received by the terminal, H represents a channel through which the data passes, $w_d$ represents the third weight, s represents the sent data, and n represents interference and noise existing when the signal passes through the channel.

The terminal processes the received signal y based on the second weight $w_p$, to obtain the received data.

According to the technical solutions in this embodiment of this application, the network device determines the first downlink statistical autocorrelation matrix based on the first uplink statistical autocorrelation matrix, and determines the third weight for data transmission with reference to the second weight that is indicated by the network device to the terminal, and the terminal may receive the data based on the second weight. Although there is a difference between the third weight and the second weight, a phase mismatch performance loss can be reduced in the foregoing manner, and a beam gain can be improved. Therefore, according to the foregoing method provided in this application, a downlink beam gain can be improved when precision of precoding indicator codebook quantization is restricted.

Figure 4:
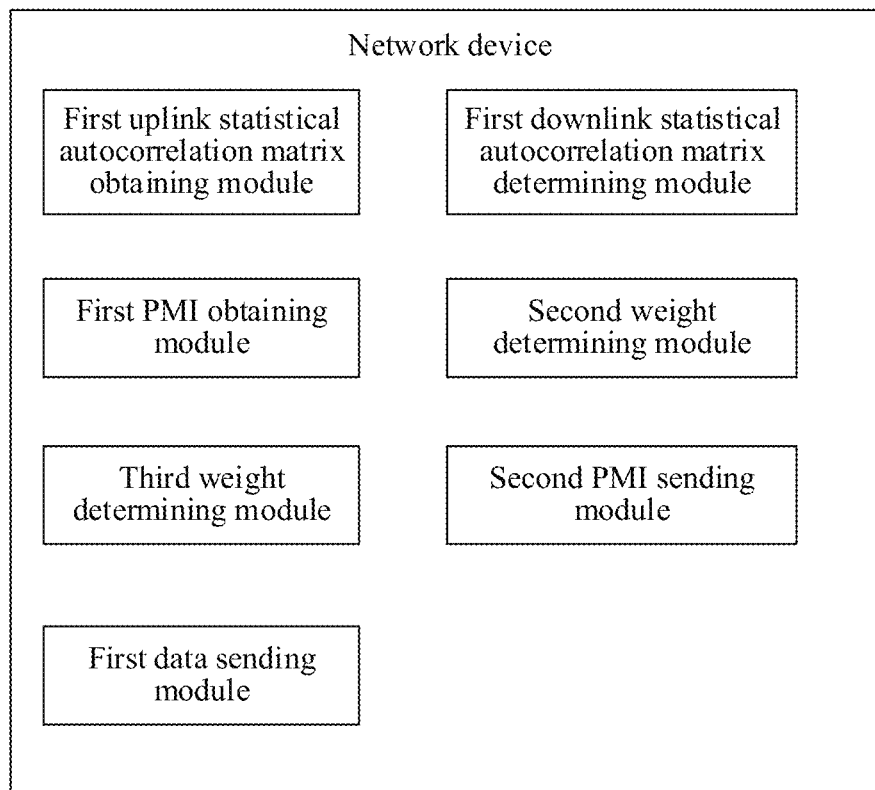
FIG. 4 is a schematic diagram of a structure of a network device according to this application.

For the network device in embodiments of this application, refer to a schematic diagram of a structure of a network device shown in FIG. 4. The network device includes a first uplink statistical autocorrelation matrix obtaining module, a first downlink statistical autocorrelation matrix determining module, a first PMI obtaining module, a second weight determining module, and a third weight determining module, a second PMI sending module, and a first data sending module.

The first uplink statistical autocorrelation matrix obtaining module is configured to perform step 201, the first downlink statistical autocorrelation matrix determining module is configured to perform step 202, the first PMI obtaining module is configured to perform step 203, the second weight determining module is configured to perform step 204, the third weight determining module is configured to perform step 205, the second PMI sending module is configured to perform step 206, and the first data sending module is configured to perform step 207.

The foregoing describes a manner in which a weight for sending data by the network device and a weight for receiving data by the terminal meet the minimum phase-offset principle. In this embodiment of this application, an adaptive weight may be determined on a terminal side, and data is sent to the network device based on the adaptive weight.

Figure 5:
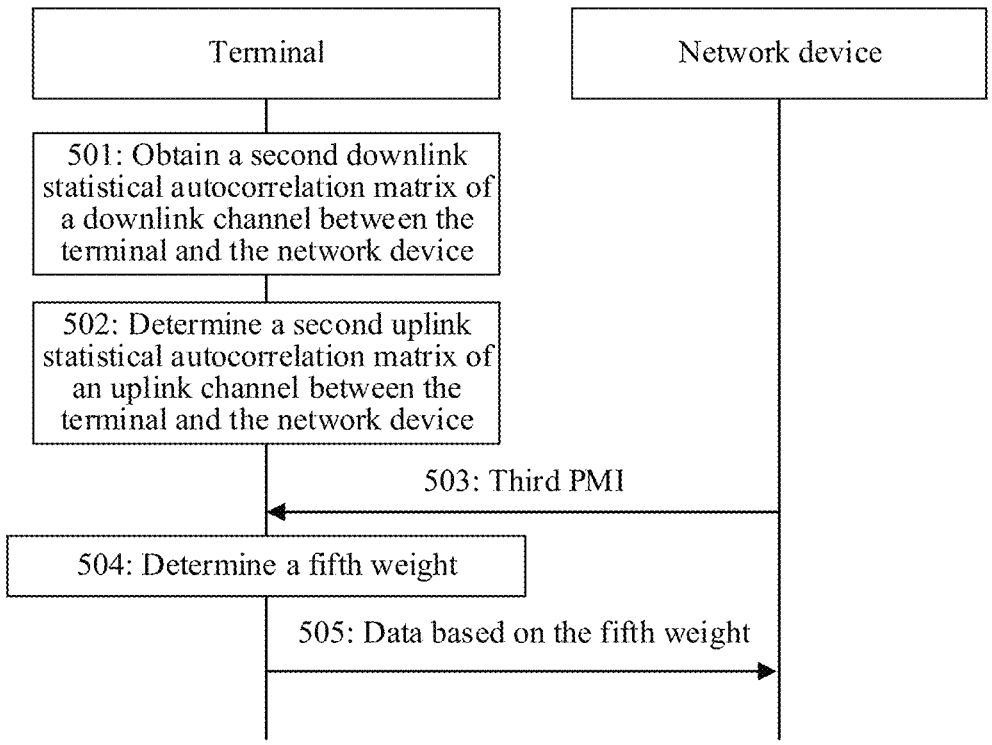
FIG. 5 is a schematic diagram of another communication method according to this application.

FIG. 5 shows another communication method according to an embodiment of this application. The method may be applied to the communication system shown in FIG. 1, but this embodiment of this application is not limited thereto. In FIG. 5, an example in which a network device and a terminal are used as execution bodies of interaction illustration is used to illustrate the method. However, this application does not limit an execution body of the interaction illustration. For example, the network device in FIG. 5 may alternatively be a chip, a chip system, or a processor that supports the network device in implementing the method, or may be a logical module or software that can implement all or some functions of the network device. The terminal in FIG. 5 may alternatively be a chip, a chip system, or a processor that supports the terminal in implementing the method, or may be a logical module or software that can implement all or some functions of the terminal. The method includes the following steps.

501: The terminal obtains a second downlink statistical autocorrelation matrix of a downlink channel between the terminal and the network device.

In this embodiment of this application, the terminal may obtain the second downlink statistical autocorrelation matrix by using a downlink reference signal, and the terminal performs downlink channel estimation based on the downlink reference signal, to obtain the second downlink statistical autocorrelation matrix. The downlink reference signal may be a CRS, or may be another downlink reference signal. This is not limited in this application.

502: The terminal determines, based on the second downlink statistical autocorrelation matrix, a second uplink statistical autocorrelation matrix of an uplink channel with the network device.

Optionally, the terminal determines the second uplink statistical autocorrelation matrix based on the second downlink statistical autocorrelation matrix and one or more of a second uplink/downlink frequency, a second antenna form, or a second dipole spacing.

Optionally, that the terminal determines the second uplink statistical autocorrelation matrix based on the second downlink statistical autocorrelation matrix and one or more of a second uplink/downlink frequency, a second antenna form, or a second dipole spacing includes: processing the second downlink statistical autocorrelation matrix based on a second transformation matrix, to obtain the second uplink statistical autocorrelation matrix. The second transformation matrix is related to one or more of the second uplink/downlink frequency, the second antenna form, or the second dipole spacing.

In this embodiment of this application, for descriptions of determining, by the terminal, the second uplink statistical autocorrelation matrix based on the second downlink statistical autocorrelation matrix in step 502, refer to related descriptions of determining, by the network device, the first downlink statistical autocorrelation matrix based on the first uplink statistical autocorrelation matrix in step 202 in FIG. 2. Details are not described herein again.

503: The network device sends a third PMI to the terminal. Correspondingly, the terminal receives the third PMI from the network device.

In this embodiment of this application, the terminal receives the third PMI from the network device, and obtains a fourth weight based on the third PMI. The fourth weight is a weight used when the network device receives data from the terminal.

It may be understood that a relative sequence between step 503 and steps 501 and 502 is not limited in this application. For example, 503 may be implemented before 501, may be implemented between 501 and 502, may be implemented after 502, or may be implemented together with 501 or 502. This is not limited in this application.

504: The terminal determines a fifth weight based on the second uplink statistical autocorrelation matrix and the fourth weight.

Optionally, the fifth weight satisfies:

$$w_d' = (R_{UL}' + (\delta')^2 I)^{-1} R_{UL}' w_p' \quad (13)$$

$w_d'$ represents the fifth weight, $w_p'$ represents the fourth weight, $R_{UL}'$ represents the second uplink statistical autocorrelation matrix, $(\delta')^2$ represents a second channel estimation error and a second quantization error, I represents an identity matrix, and $(\cdot)^{-1}$ represents inversion.

In this embodiment of this application, for a manner of determining, by the terminal, the fifth weight based on the second uplink statistical autocorrelation matrix and the fourth weight in step 504, refer to related descriptions of determining, by the network device, the third weight based on the first downlink statistical autocorrelation matrix and the second weight in FIG. 2. Details are not described herein again.

505: The terminal sends data to the network device based on the fifth weight, and correspondingly, the network device receives the data based on the fourth weight.

After determining the fifth weight, the terminal may weight service data to be sent to the network device by using the determined fifth weight, and then send weighted service data to the network device. A signal received by the network device satisfies the following formula:

$$y' = H' w_d' s' + n' \quad (14)$$

y' represents the signal received by the network device, H' represents a channel through which the data passes, $w_d'$ represents the fifth weight, s' represents the data sent by the terminal, and n' represents interference and noise existing when the data passes through the channel.

The network device processes the received signal y' based on the fourth weight $w_p'$, to obtain the received data.

According to the foregoing method, the terminal exchanges the data with the network device, and the terminal cannot obtain related information about the uplink channel through channel estimation. The terminal may determine, based on the second downlink statistical autocorrelation matrix of the downlink channel, the second uplink statistical autocorrelation matrix of the uplink channel, and determine, based on the fourth weight indicated by the network device and the second uplink statistical autocorrelation matrix, the fifth weight different from the fourth weight. The terminal sends the data based on the fifth weight, and the network device receives the data based on the fourth weight. Although there is a phase difference between the fifth weight and the fourth weight, a phase mismatch performance loss is small, and a beam gain can be improved. Therefore, according to the foregoing method provided in this application, an uplink beam gain can be improved when precision of precoding indicator codebook quantization is restricted.

Figure 6:
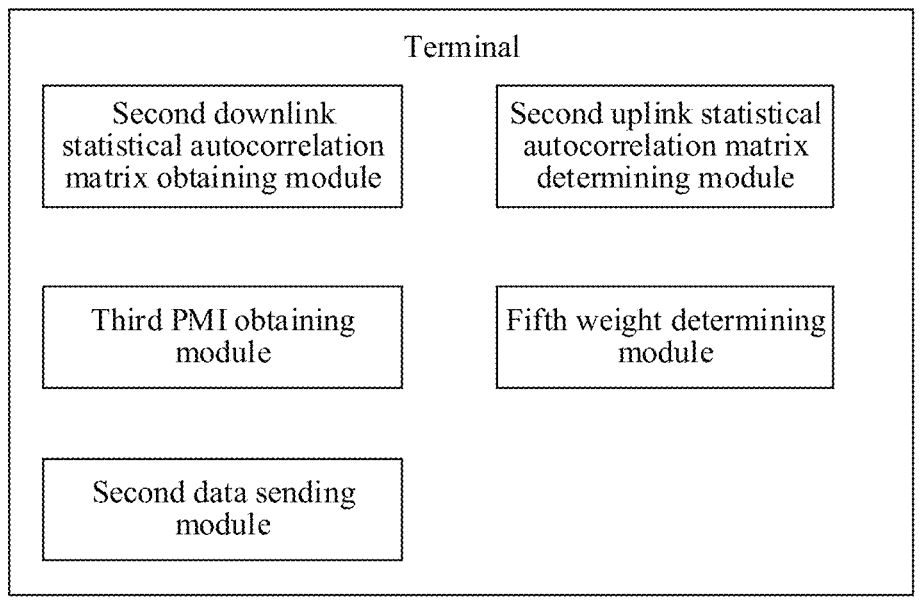
FIG. 6 is a schematic diagram of a structure of a terminal according to this application.

For the terminal in embodiments of this application, refer to a schematic diagram of a structure of a terminal shown in FIG. 6. The terminal includes a second downlink statistical autocorrelation matrix obtaining module, a second uplink statistical autocorrelation matrix determining module, a third PMI obtaining module, a fifth weight determining module, and a second data sending module.

The second downlink statistical autocorrelation matrix obtaining module is configured to perform step 501, the second uplink statistical autocorrelation matrix determining module is configured to perform step 502, the third PMI obtaining module is configured to perform step 503, the fifth weight determining module is configured to perform step 504, and the second data sending module is configured to perform step 505.

Figure 7:
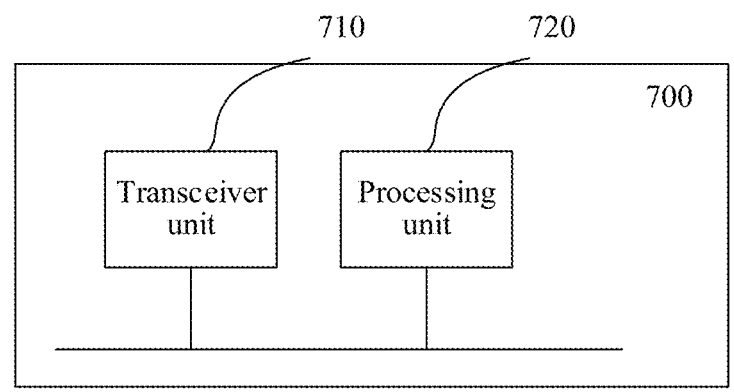
FIG. 7 is a schematic diagram of a communication apparatus according to this application.

FIG. 7 is a schematic diagram of a communication apparatus according to an embodiment of this application. The communication apparatus is configured to implement steps of the corresponding network device or terminal in the foregoing embodiments. As shown in FIG. 7, a communication apparatus 700 includes a transceiver unit 710 and a processing unit 720.

In the first embodiment, the communication apparatus is configured to implement steps of the corresponding network device in the foregoing embodiments.

The processing unit 720 is configured to: obtain a first uplink statistical autocorrelation matrix of an uplink channel with the terminal, determine, based on the first uplink statistical autocorrelation matrix, a first downlink statistical autocorrelation matrix of a downlink channel with the terminal, obtain a first precoding matrix indicator PMI from the terminal, where the first PMI indicates a first weight, determine a second weight based on the first weight, and determine a third weight based on the first downlink statistical autocorrelation matrix and the second weight, where the third weight is different from the second weight;

the transceiver unit 710 is configured to send a second PMI to the terminal, where the second PMI indicates the second weight; and the processing unit 720 is configured to: control, based on the third weight, the transceiver unit 710 to send data to the terminal.

Optionally, that the processing unit 720 is configured to: determine, based on the first uplink statistical autocorrelation matrix, the first downlink statistical autocorrelation matrix of the downlink channel with the terminal includes:

The processing unit 720 is configured to: determine the first downlink statistical autocorrelation matrix based on the first uplink statistical autocorrelation matrix and one or more of a first uplink/downlink frequency, a first antenna form, or a first dipole spacing.

Optionally, that the processing unit 720 is configured to: determine the first downlink statistical autocorrelation matrix based on the first uplink statistical autocorrelation matrix and one or more of a first uplink/downlink frequency, a first antenna form, or a first dipole spacing includes:

The processing unit 720 is configured to: process the first uplink statistical autocorrelation matrix based on a first transformation matrix, to obtain the first downlink statistical autocorrelation matrix. The first transformation matrix is related to one or more of the first uplink/downlink frequency, the first antenna form, or the first dipole spacing.

Optionally, the third weight satisfies:

$$w_d = (R_{DL} + \delta^2 I)^{-1} R_{DL} w_p$$

$w_d$ represents the third weight, $w_p$ represents the second weight, $R_{DL}$ represents the first downlink statistical autocorrelation matrix, $\delta^2$ represents a first channel estimation error and a first quantization error, I represents an identity matrix, and $(\cdot)^{-1}$ represents inversion.

In the second embodiment, the communication apparatus is configured to implement steps of the corresponding terminal in the foregoing embodiments.

The processing unit 720 is configured to: obtain a second downlink statistical autocorrelation matrix of a downlink channel between the terminal and the network device, determine, based on the second downlink statistical autocorrelation matrix, a second uplink statistical autocorrelation matrix of an uplink channel with the network device, obtain a third precoding matrix indicator PMI from the network device, where the third PMI indicates a fourth weight, and determine a fifth weight based on the second uplink statistical autocorrelation matrix and the fourth weight, where the fifth weight is different from the fourth weight; and the processing unit 720 is further configured to: control, based on the fifth weight, the transceiver unit 710 to send data to the network device.

Optionally, that the processing unit 720 is configured to: determine, based on the second downlink statistical autocorrelation matrix, the second uplink statistical autocorrelation matrix of the uplink channel between with the network device includes:

The processing unit 720 is configured to: determine the second uplink statistical autocorrelation matrix based on the second downlink statistical autocorrelation matrix and one or more of a second uplink/downlink frequency, a second antenna form, or a second dipole spacing.

Optionally, that the processing unit 720 is configured to: determine the second uplink statistical autocorrelation matrix based on the second downlink statistical autocorrelation matrix and one or more of a second uplink/downlink frequency, a second antenna form, or a second dipole spacing includes:

The processing unit 720 is configured to: process the second downlink statistical autocorrelation matrix based on a second transformation matrix, to obtain the second uplink statistical autocorrelation matrix. The second transformation matrix is related to one or more of the second uplink/downlink frequency, the second antenna form, or the second dipole spacing.

Optionally, the fifth weight satisfies:

$$w_d' = (R_{UL}' + (\delta')^{-1} R_{UL}' w_p'$$

$w_d'$ represents the fifth weight, $w_p'$ represents the fourth weight, $R_{UL}'$ represents the second uplink statistical autocorrelation matrix, $(\delta')^2$ represents a second channel estimation error and a second quantization error, I represents an identity matrix, and $(\bullet)^{-1}$ represents inversion.

Optionally, the communication apparatus may further include a storage unit. The storage unit is configured to store data or instructions (which may also be referred to as code or a program). The foregoing units may interact with or be coupled to the storage unit to implement a corresponding method or function. For example, the processing unit 720 may read the data or the instructions in the storage unit, to enable the communication apparatus to implement the method in the foregoing embodiments.

It should be understood that division into the units in the communication apparatus is merely logical function division. In an actual implementation, all or some of the units may be integrated into one physical entity, or may be physically separated. In addition, all units in the communication apparatus may be implemented in a form of invoking software by using a processing element or may be implemented in a form of hardware; or some units may be implemented in a form of invoking software by using a processing element, and some units may be implemented in a form of hardware. For example, each unit may be a separately disposed processing element, or may be implemented by being integrated into a chip of the communication apparatus. In addition, each unit may be stored in a memory in a form of a program, and a function of the unit is invoked and executed by a processing element of the communication apparatus. In addition, all or some of these units may be integrated together, or may be implemented independently. The processing element described herein may also be referred to as a processor, and may be an integrated circuit that has a signal processing capability. During an implementation process, steps in the foregoing methods or the foregoing units may be implemented by using a hardware integrated logic circuit in the processor element, or may be implemented in the form of invoking software by using a processing element.

In an example, any one of the foregoing units in the communication apparatus may be one or more integrated circuits configured to implement the foregoing method, for example, one or more application-specific integrated circuits (application-specific integrated circuits, ASICs), one or more microprocessors (digital signal processors, DSPs), one or more field programmable gate arrays (field programmable gate arrays, FPGAs), or a combination of at least two of these integrated circuit forms. For another example, when the units in the communication apparatus may be implemented in a form of invoking a program by a processing element, the processing element may be a general purpose processor, for example, a central processing unit (central processing unit, CPU) or another processor that can invoke the program. For still another example, the units may be integrated together and implemented in a form of a system-on-a-chip (system-on-a-chip, SoC).

Figure 8:
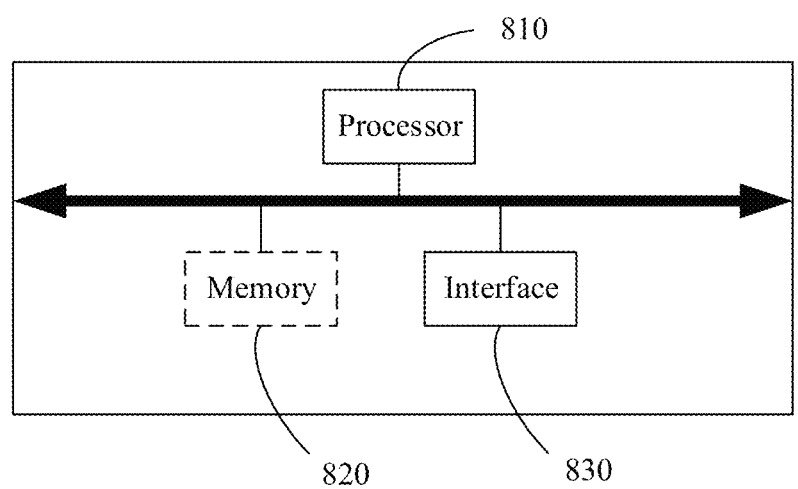
FIG. 8 is a schematic diagram of another communication apparatus according to this application.

FIG. 8 is a schematic diagram of a communication apparatus according to an embodiment of this application. The communication apparatus is configured to implement operations of the network device or the terminal in the foregoing embodiments. As shown in FIG. 8, the communication apparatus includes a processor 810 and an interface 830. The processor 810 is coupled to the interface 830. The interface 830 is configured to communicate with another device. The interface 830 may be a transceiver or an input/output interface. The interface 830 may be, for example, an interface circuit. Optionally, the communication apparatus further includes a memory 820. The memory 820 is configured to store instructions executed by the processor 810, store input data required by the processor 810 to run the instructions, or store data generated after the processor 810 runs the instructions.

The method performed by the network device or the terminal in the foregoing embodiments may be implemented by invoking, by the processor 810, a program in a memory (which may be the memory 820 in the network device or the terminal, or may be an external memory). In other words, the network device or the terminal may include the processor 810. The processor 810 invokes the program in the memory to perform the method performed by the network device or the terminal in the foregoing method embodiments. The processor herein may be an integrated circuit having a signal processing capability, for example, a CPU. The network device or the terminal may be implemented by using one or more integrated circuits configured to implement the foregoing method, for example, one or more ASICs, one or more microprocessors DSPs, one or more FPGAs, or a combination of at least two of these integrated circuit forms. Alternatively, the foregoing implementations may be combined.

Specifically, functions/implementation processes of the transceiver unit 710 and the processing unit 720 in FIG. 7 may be implemented by the processor 810 in the communication apparatus 800 shown in FIG. 8 by invoking computer-executable instructions stored in the memory 820. Alternatively, the function/implementation process of the processing unit 720 in FIG. 7 may be implemented by the processor 810 in the communication apparatus 800 shown in FIG. 8 by invoking the computer-executable instructions stored in the memory 820, and the function/implementation process of the transceiver unit 710 in FIG. 7 may be implemented by the interface 830 in the communication apparatus 800 shown in FIG. 8. For example, the function/implementation process of the transceiver unit 710 may be implemented by the processor invoking a program instruction in the memory to drive the interface 830.

When the communication apparatus is a chip used in a terminal device, the chip in the terminal device implements the functions of the terminal device in the foregoing method embodiments. The chip of the terminal device receives information from another module (for example, a radio frequency module or an antenna) in the terminal device, where the information comes from another terminal device or network device. Alternatively, the chip of the terminal device sends information to another module (for example, a radio frequency module or an antenna) in the terminal device, where the information is sent by the terminal device to another terminal device or network device.

When the communication apparatus is a chip used in a network device, the chip of the network device implements the functions of the network device in the foregoing method embodiments. The chip of the network device receives information from another module (for example, a radio frequency module or an antenna) in the network device, where the information comes from another network device or terminal device. Alternatively, the chip of the network device sends information to another module (for example, a radio frequency module or an antenna) in the network device, where the information is sent by the network device to another network device or terminal device.

In another embodiment of this application, a computer-readable storage medium is further provided, and the computer-readable storage medium stores computer-executable instructions. When a processor of a device executes the computer-executable instructions, the device performs the steps of the communication method performed by the network device in the foregoing method embodiment in FIG. 2.

In another embodiment of this application, a computer-readable storage medium is further provided, and the computer-readable storage medium stores computer-executable instructions. When a processor of a device executes the computer-executable instructions, the device performs the steps of the communication method performed by the terminal in the foregoing method embodiment in FIG. 5.

In another embodiment of this application, a computer program product is further provided. The computer program product includes computer-executable instructions, and the computer-executable instructions are stored in a computer-readable storage medium. When a processor of a device executes the computer-executable instructions, the device performs the steps of the communication method performed by the network device in the foregoing method embodiment in FIG. 2.

In another embodiment of this application, a computer program product is further provided. The computer program product includes computer-executable instructions, and the computer-executable instructions are stored in a computer-readable storage medium. When a processor of a device executes the computer-executable instructions, the device performs the steps of the communication method performed by the terminal in the foregoing method embodiment in FIG. 5.

A person skilled in the art may clearly understand that, for a purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely schematic. For example, the division into the units is merely logical function division. In actual application, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on an actual requirement to achieve an objective of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, a part that essentially makes contributions of the technical solutions of this application, or some or all of the technical solutions may be embodied in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

What is claimed is:

1. A communication method, comprising:
   obtaining a first uplink statistical autocorrelation matrix of an uplink channel with a terminal;
   determining, based on the first uplink statistical autocorrelation matrix, a first downlink statistical autocorrelation matrix of a downlink channel with the terminal;
   obtaining a first precoding matrix indicator (PMI) from the terminal, wherein the first PMI indicates a first weight;
   determining a second weight based on the first weight;
   determining a third weight based on the first downlink statistical autocorrelation matrix and the second weight, wherein the third weight is different from the second weight;
   sending a second PMI to the terminal, wherein the second PMI indicates the second weight; and
   sending data to the terminal based on the third weight.

2. The communication method of claim 1, wherein the determining, based on the first uplink statistical autocorrelation matrix, the first downlink statistical autocorrelation matrix of the downlink channel with the terminal comprises:
   determining the first downlink statistical autocorrelation matrix based on the first uplink statistical autocorrelation matrix and one or more of a first uplink/downlink frequency, a first antenna form, or a first dipole spacing.

3. The communication method of claim 2, wherein the determining the first downlink statistical autocorrelation matrix based on the first uplink statistical autocorrelation matrix and one or more of the first uplink/downlink frequency, the first antenna form, or the first dipole spacing comprises:
   processing the first uplink statistical autocorrelation matrix based on a first transformation matrix, to obtain the first downlink statistical autocorrelation matrix, wherein the first transformation matrix is related to one or more of the first uplink/downlink frequency, the first antenna form, or the first dipole spacing.

4. The communication method of claim 1, wherein the third weight satisfies:

$$w_d = (R_{DL} + \delta^2 I)^{-1} R_{DL} w_p, \text{ wherein}$$

$w_d$ represents the third weight, $w_p$ represents the second weight, $R_{DL}$ represents the first downlink statistical autocorrelation matrix, $\delta^2$ represents a first channel estimation error and a first quantization error, I represents an identity matrix, and $(\bullet)^{-1}$ represents inversion.

5. A communication method, comprising:
   obtaining a second downlink statistical autocorrelation matrix of a downlink channel with a network device;
   determining, based on the second downlink statistical autocorrelation matrix, a second uplink statistical autocorrelation matrix of an uplink channel with the network device;
   obtaining a third precoding matrix indicator (PMI) from the network device, wherein the third PMI indicates a fourth weight;
   determining a fifth weight based on the second uplink statistical autocorrelation matrix and the fourth weight, wherein the fifth weight is different from the fourth weight; and
   sending data to the network device based on the fifth weight.

6. The communication method of claim 5, wherein the determining, based on the second downlink statistical autocorrelation matrix, the second uplink statistical autocorrelation matrix of the uplink channel with the network device comprises:
   determining the second uplink statistical autocorrelation matrix based on the second downlink statistical autocorrelation matrix and one or more of a second uplink/downlink frequency, a second antenna form, or a second dipole spacing.

7. The communication method of claim 6, wherein the determining the second uplink statistical autocorrelation matrix based on the second downlink statistical autocorrelation matrix and one or more of the second uplink/downlink frequency, the second antenna form, or the second dipole spacing comprises:
   processing the second downlink statistical autocorrelation matrix based on a second transformation matrix, to obtain the second uplink statistical autocorrelation matrix, wherein the second transformation matrix is related to one or more of the second uplink/downlink frequency, the second antenna form, or the second dipole spacing.

8. The communication method of claim 5, wherein the fifth weight satisfies:

$$w_d' = (R_{UL}' + (\delta')^2 I)^{-1} R_{UL}' w_p', \text{ wherein}$$

$w_d'$ represents the fifth weight, $w_p'$ represents the fourth weight, $R_{UL}'$ represents the second uplink statistical autocorrelation matrix, $(\delta')^2$ represents a second channel estimation error and a second quantization error, I represents an identity matrix, and $(\bullet)^{-1}$ represents inversion.

9. An apparatus, comprising:
   one or more processors configured to execute instructions causing the apparatus to:
   obtain a first uplink statistical autocorrelation matrix of an uplink channel with a terminal;
   determine, based on the first uplink statistical autocorrelation matrix, a first downlink statistical autocorrelation matrix of a downlink channel with the terminal;
   obtain a first precoding matrix indicator (PMI) from the terminal, wherein the first PMI indicates a first weight;
   determine a second weight based on the first weight;
   determine a third weight based on the first downlink statistical autocorrelation matrix and the second weight, wherein the third weight is different from the second weight;
   send a second PMI to the terminal, wherein the second PMI indicates the second weight; and
   send data to the terminal based on the third weight.

10. The apparatus of claim 9, wherein the instructions are executed to cause the apparatus to determine, based on the first uplink statistical autocorrelation matrix, the first downlink statistical autocorrelation matrix of the downlink channel with the terminal by determining the first downlink statistical autocorrelation matrix based on the first uplink statistical autocorrelation matrix and one or more of a first uplink/downlink frequency, a first antenna form, or a first dipole spacing.

11. The apparatus of claim 10, wherein the instructions are executed to cause the apparatus to determine the first downlink statistical autocorrelation matrix based on the first uplink statistical autocorrelation matrix and one or more of the first uplink/downlink frequency, the first antenna form, or the first dipole spacing by
   processing the first uplink statistical autocorrelation matrix based on a first transformation matrix, to obtain the first downlink statistical autocorrelation matrix, wherein the first transformation matrix is related to one or more of the first uplink/downlink frequency, the first antenna form, or the first dipole spacing.

12. The apparatus of claim 9, wherein the third weight satisfies:

$$w_d = (R_{DL} + \delta^2 I)^{-1} R_{DL} w_p, \text{ wherein}$$

$w_d$ represents the third weight, $w_p$ represents the second weight, $R_{DL}$ represents the first downlink statistical autocorrelation matrix, $\delta^2$ represents a first channel estimation error and a first quantization error, I represents an identity matrix, and $(\bullet)^{-1}$ represents inversion.

13. An apparatus, comprising:
   one or more processors configured to execute instructions causing the apparatus to:
   obtain a second downlink statistical autocorrelation matrix of a downlink channel with a network device;

determine, based on the second downlink statistical autocorrelation matrix, a second uplink statistical autocorrelation matrix of an uplink channel with the network device;

obtain a third precoding matrix indicator (PMI) from the network device, wherein the third PMI indicates a fourth weight;

determine a fifth weight based on the second uplink statistical autocorrelation matrix and the fourth weight, wherein the fifth weight is different from the fourth weight; and send data to the network device based on the fifth weight.

14. The apparatus of claim 13, wherein the instructions are executed to cause the apparatus to determine, based on the second downlink statistical autocorrelation matrix, the second uplink statistical autocorrelation matrix of the uplink channel with the network device by determining the second uplink statistical autocorrelation matrix based on the second downlink statistical autocorrelation matrix and one or more of a second uplink/downlink frequency, a second antenna form, or a second dipole spacing.

15. The apparatus of claim 14, wherein the instructions are executed to cause the apparatus to determine the second uplink statistical autocorrelation matrix based on the second downlink statistical autocorrelation matrix and one or more of the second uplink/downlink frequency, the second antenna form, or the second dipole spacing by processing the second downlink statistical autocorrelation matrix based on a second transformation matrix, to obtain the second uplink statistical autocorrelation matrix, wherein the second transformation matrix is related to one or more of the second uplink/downlink frequency, the second antenna form, or the second dipole spacing.

16. The apparatus of claim 13, wherein the fifth weight satisfies:

$$w_d' = (R_{UL}' + (\delta')^{-1} R_{UL}' w_p', \text{ wherein}$$

$w_d'$ represents the fifth weight, $w_p'$ represents the fourth weight, $R_{UL}'$ represents the second uplink statistical autocorrelation matrix, $(\delta')^2$ represents a second channel estimation error and a second quantization error, I represents an identity matrix, and $(\bullet)^{-1}$ represents inversion.

* * * * *